United States Patent
Shepherd

(10) Patent No.: US 6,600,820 B2
(45) Date of Patent: *Jul. 29, 2003

(54) TELECOMMUNICATIONS SWITCHING NETWORK FOR MAKING INTERCONNECTIONS IN ACCORDANCE WITH CUSTOMER DATA

(75) Inventor: John W Shepherd, Kent (GB)

(73) Assignee: British Telecommunications Public Limited Company, London (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/142,482
(22) PCT Filed: Jul. 1, 1998
(86) PCT No.: PCT/GB98/01929
§ 371 (c)(1), (2), (4) Date: Sep. 9, 1998
(87) PCT Pub. No.: WO99/01976
PCT Pub. Date: Jan. 14, 1999

(65) Prior Publication Data
US 2002/0051528 A1 May 2, 2002

(30) Foreign Application Priority Data
Jul. 3, 1997 (EP) .......................................... 97304849

(51) Int. Cl.$^7$ ............................. H04M 7/00; H04M 3/42
(52) U.S. Cl. .............. 379/230; 379/207.02; 379/221.01
(58) Field of Search .......... 379/202.01, 207.01–207.16, 379/204.01, 229, 230, 220.01, 265.01–265.14, 266.01–266.1, 309, 219, 221.01–221.15

(56) References Cited

U.S. PATENT DOCUMENTS

| | | | |
|---|---|---|---|
| 5,452,350 A | * 9/1995 | Reynolds et al. | ...... 379/220.01 |
| 5,583,564 A | * 12/1996 | Rao et al. | ...................... 348/14 |
| 5,764,745 A | * 6/1998 | Chan et al. | .................. 379/207 |
| 6,289,094 B1 | * 9/2001 | Miloslavsky | ........... 379/220.01 |

* cited by examiner

Primary Examiner—Benny Q. Tieu
(74) Attorney, Agent, or Firm—Nixon & Vanderhye PC

(57) ABSTRACT

When a Service Switching Point (1,2) of a telecommunications network receives signalling from a first customer telephone (5) for a destination customer line equipped with a special divert response CPE, network signalling is used to request from the destination line specified by the digits signaled by the first customer, data defining a network destination to which the call is to be connected. The call may be diverted to another telephone or may be diverted to network apparatus arranged to provide voice information and/or data collection facilities to enable further decision on the ultimate destination of the incoming call.

8 Claims, 10 Drawing Sheets

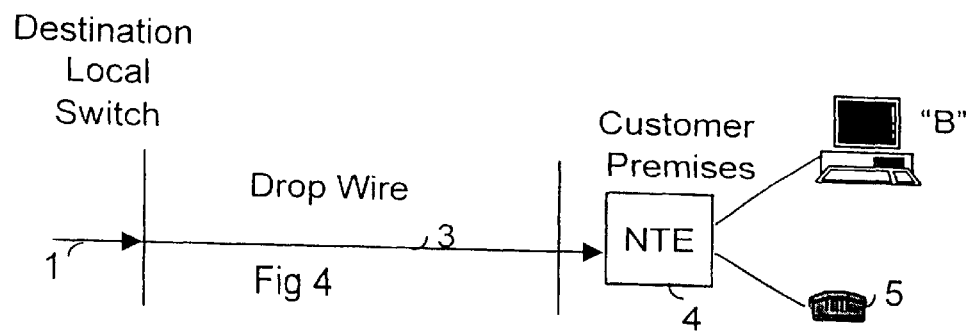
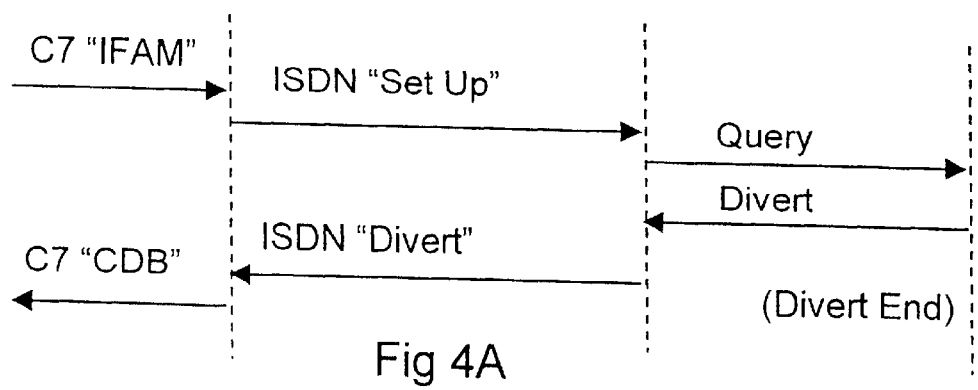
Fig 4A
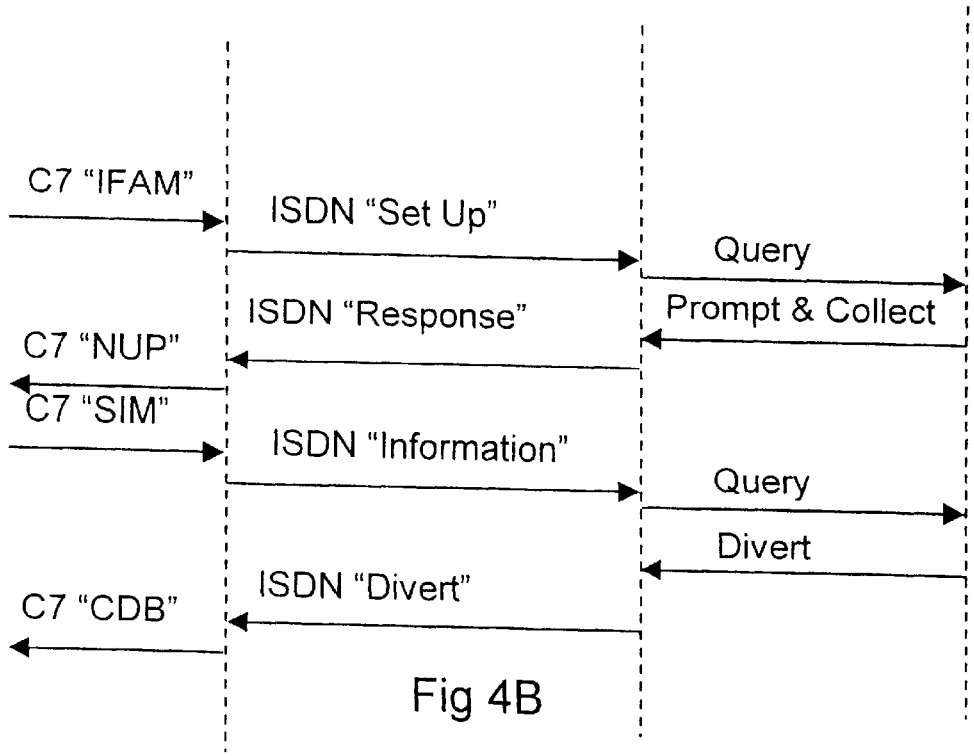
Fig 4B

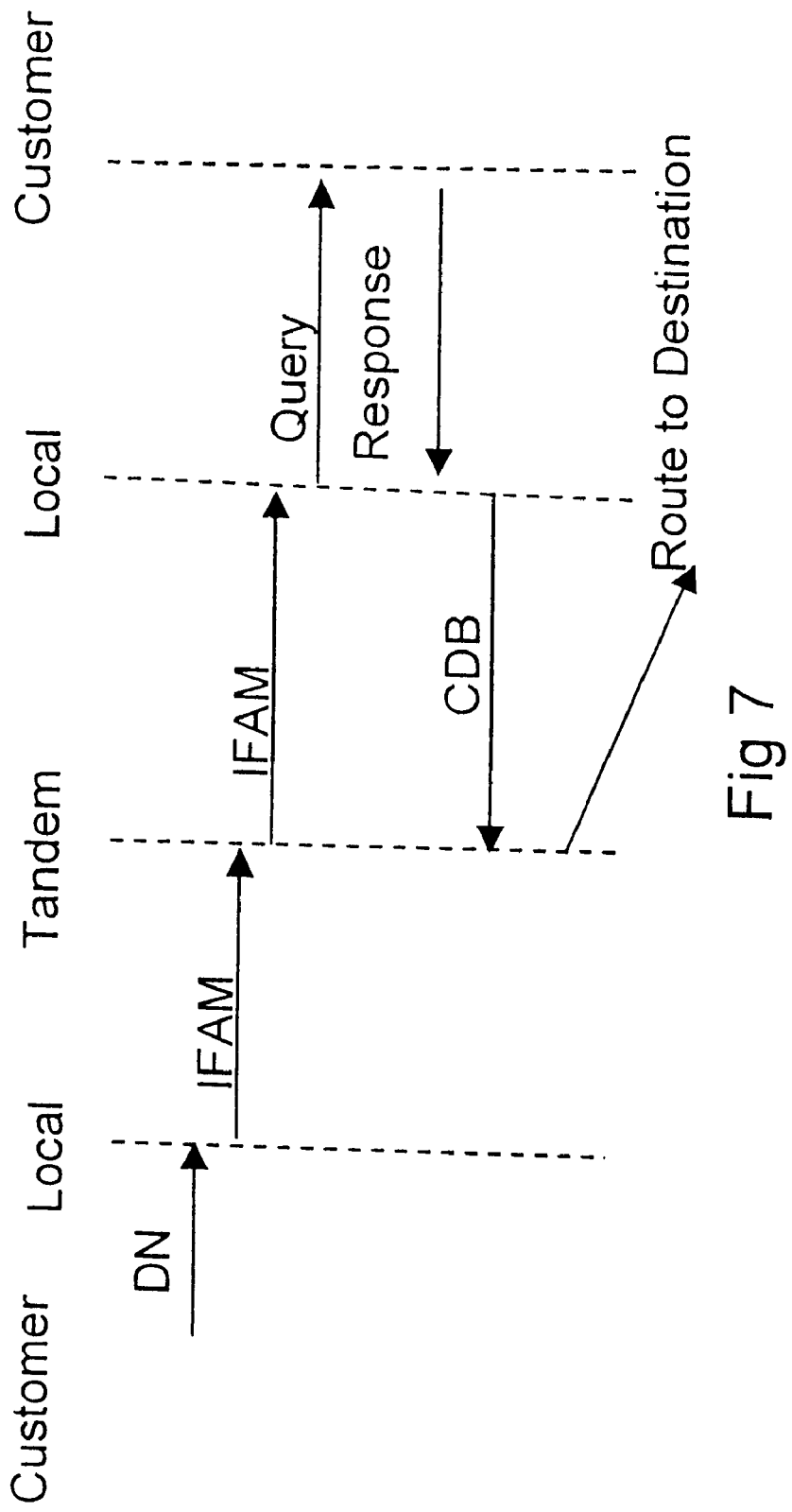

TELECOMMUNICATIONS SWITCHING NETWORK FOR MAKING INTERCONNECTIONS IN ACCORDANCE WITH CUSTOMER DATA

BACKGROUND OF THE INVENTION

The present invention relates to telecommunications networks and more particularly to access to data for use in such networks.

As the public switched telephone network (PSTN) becomes more sophisticated and customers demand more advanced services from the PSTN operators the amount of information which must be stored by the network operator to enable calls to be processed rises significantly.

Unless all data is stored centrally in the PSTN, access to the data from different switches in the network may become complex and ensuring that replicated data is compatible (i.e. that corresponding data is stored at all points in the network) can be difficult. Further, huge data stores may be required to store the data whether on a distributed or central basis. Access to larger data stores especially if centralised may be time consuming and when large numbers of accesses occur simultaneously blocking of the data store access network may occur.

A still further problem arises when customers wish to update service information, since either operator intervention will be required or some form of customer direct access to the network data must be permitted. Maintaining the security of network data when customer modification of the data is permitted can add to the complexities of operating such systems. Further, if the data is stored in more than one place then each time a customer wishes to update data, even on a short term basis, several data modifying messages may need to be transferred across the network.

SUMMARY OF THE INVENTION

According to the present invention there is provided a switching network having a plurality of switches interconnected to provide telecommunications services to customers, the network being responsive to signals from a first customer indicating a request for connection to a second customer wherein the network uses digital information characterising the signals received to effect connection to customer premises equipment by way of a signalling path, forwarding signals to cause the customer premises equipment to respond with data characterising the destination, the network causing a voice path to be set up between the first customer and the destination characterised by the data received.

Preferably signalling characterising the second customer connection point is transferred across the network from a first of the plurality of switches closer to the first customer to a second of the plurality of switches closer to the second customer using a first network protocol and signalling characterising the data received from the second customer is transferred from the second switch to the first switch using the same protocol.

Signalling between the second switch and the customer premises equipment may use a data channel of an ISDN connection or may use an out of band carrier arrangement on a normal telephony connection to the customer premises. Alternatively, the network may be arranged to set up a no-ring call to the second customer's customer premises equipment for the purposes of collecting data. Ringing or no ring calls to a dedicated customer line could also be used as an alternative connection arrangement.

The data returned by the customer premises equipment may cause the network to connect the first customer to apparatus for receiving additional information from the first customer and, on receipt of such additional information, the network making a further enquiry call to the second customer, the customer premises equipment responding to the second enquiry call with data characterising a network destination.

Data forwarded to the second customer may include data defining the origin of the call whereby the customer premises equipment may return a different destination in respect of calls originating from differing locations.

BRIEF DESCRIPTION OF THE DRAWINGS

A telecommunications network in accordance with the invention will now be described by way of example only with reference to the accompanying drawings of which:

FIG. 4 shows a first arrangement between a local switch of FIG. 1 and customer premises equipment;

FIGS. 4a and 4b are signalling charts showing interaction between the network and the customer premises equipment of FIG. 4;

FIG. 7 shows signalling where the direct interaction is between a tandem exchange and the customer;

DETAILED DESCRIPTION OF THE INVENTION

Figure 1:
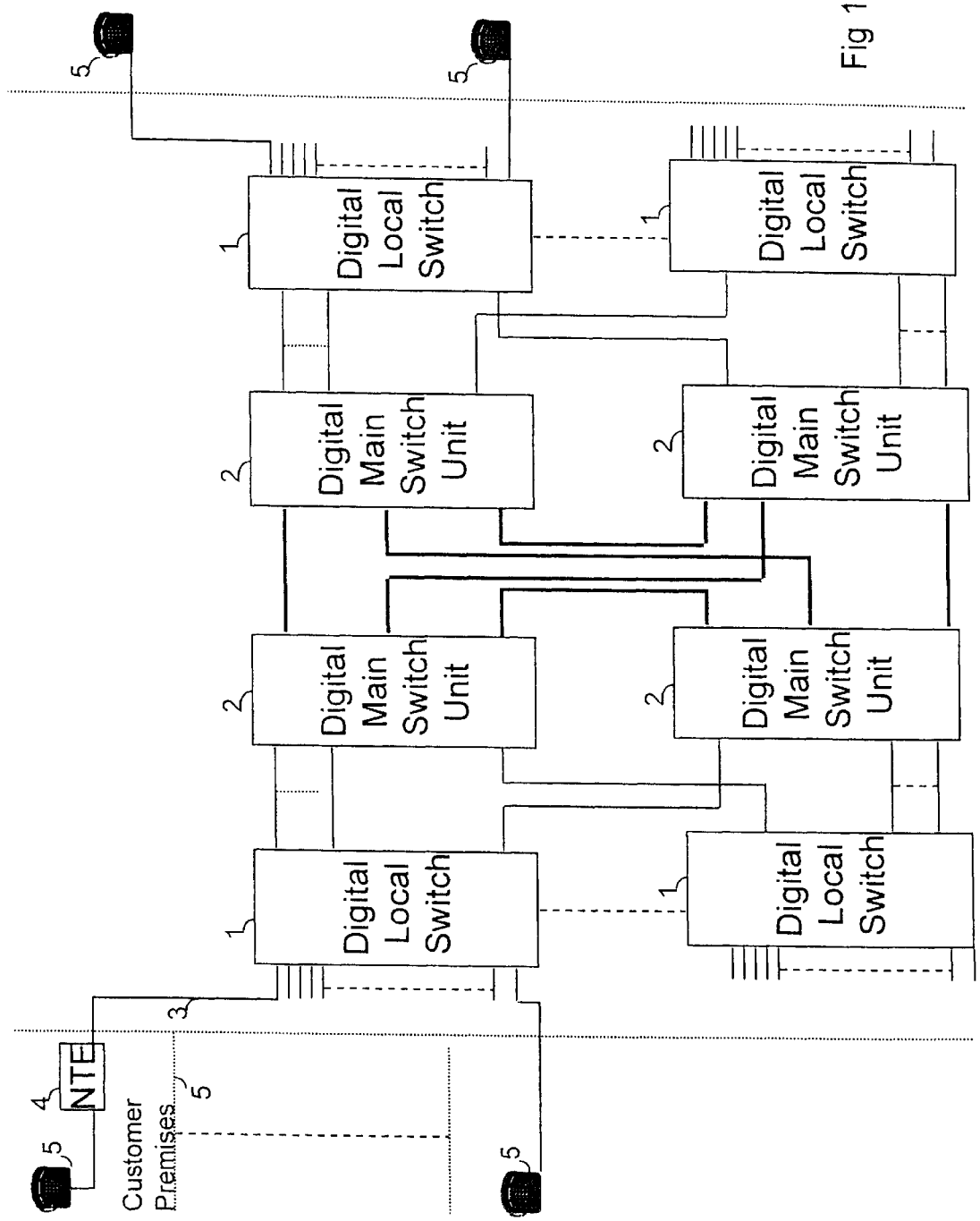
FIG. 1 shows a typical digital PSTN.

Referring now to FIG. 1, a typical PSTN comprises a number of switches represented by digital local switch units (DLEs) 1 and digital main switching units (DMSUs) 2 (sometimes referred to as tandem switching units). The DLEs 1 each provide the local presence for customers by way of the local loop 3 to network termination equipment (NTE) 4 in the customer's premises. Customers may connect equipment by way of a plug and socket arrangement for example to the NTE 4 such equipment including telephone 5, fax or computer equipment (not shown).

The switches 1 and 2 are fully interconnected so that any telephone 5 coupled to the network may be connected to any other telephone 5 or to telephone equipments in other networks. Interconnection may be by way of optical fibre, radio or other suitable trunk connection means.

Figure 2:
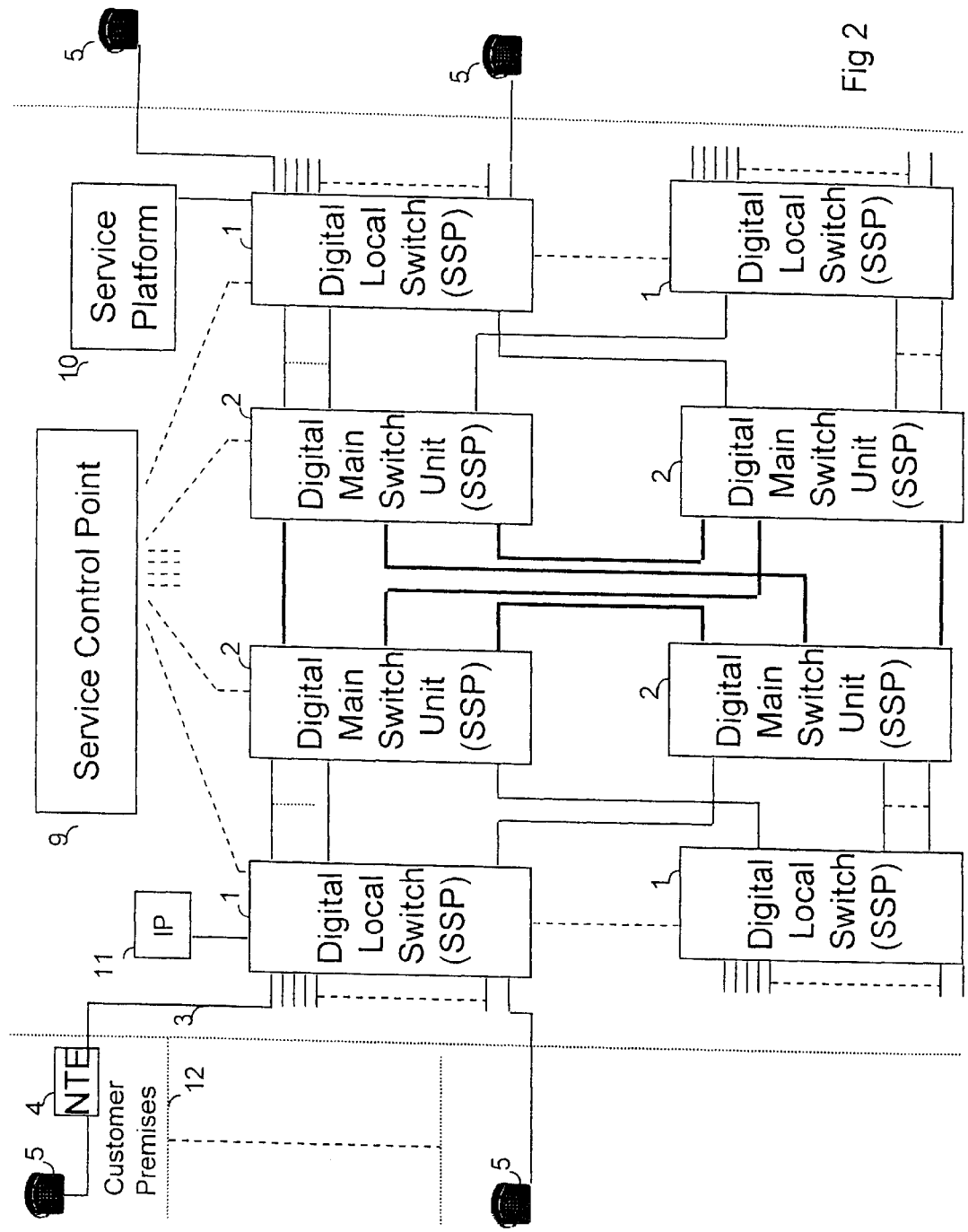
FIG. 2 shows an alternative implementation of a digital PSTN of the kind sometimes referred to as an intelligent network.

Turning now to FIG. 2, in a so called intelligent network the digital switches 1 and 2 are replaced by or act as service switching points (SSPs) which have substantially the same function but which have a control processor which can receive instructions by way of a signalling network from a service control (SCP) 9. Thus if the control processor of one of the SSPs requires additional information to enable a call to be switched through the network or to be connected to a specialised service platform 10 or a so called intelligent peripheral 11, it may seek destination information from a SCP 9 by way of the signalling network. The SCP 9 will download certain control information to the control processor of the SSP and may cause it to set further triggers for re-application to the SCP 9 at a subsequent time.

Thus, if a customer dials a service number which requires connection of an announcement and collection of additional digits, for example, the SCP 9 will instruct the respective SSP 1 to effect connection to an appropriate intelligent peripheral 11 capable of making a specific announcement. If further digits are to be collected then a trigger set message is provided with the switching detail so that when the SSP receives additional data from the customer premises it may re-apply to SCP 9 for final switching instruction.

The PSTN operators often provide special services to business customers such that the business may have a dedicated single telephone number accessible from any part of a national network for example, and will direct telephone calls through the network to various points of the network which may vary, for example, in dependence upon time of day or day of week. Thus, the destination telephone number and the actual point in the network to which the answering telephone 5 is connected may not be physically related. Thus, each time a call is destined for the customer telephone number the control means of the network, either in the switches 1 and 2 of FIG. 1 or in the SCP in association with the SSPs of FIG. 2 determine what the customer's requirement in respect of destination of the call may be.

This inhibits short term amendments to the routing arrangement for the destination customer since it necessitates the network operator being notified of changes and requires intervention in data held within the PSTN.

Figure 3:
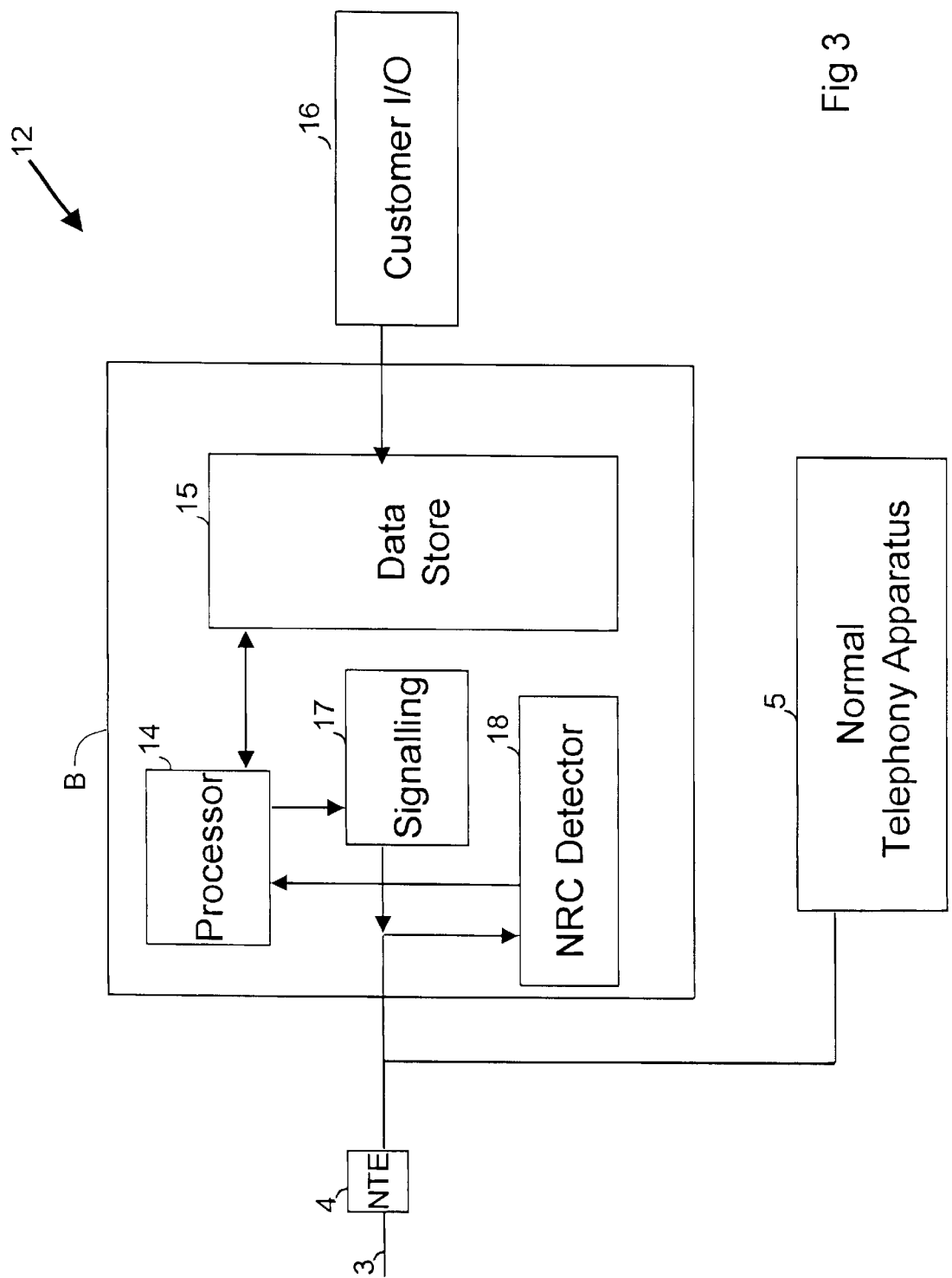
FIG. 3 shows apparatus for connection at a customer's premises of the networks of FIGS. 1 and 2.

Referring to FIG. 3, at customer premises 12, the NTE 4 may have connected to it a processing unit in addition to normal telephony apparatus 5. The additional equipment "B" will at least comprise a processor 14 with an associated data store 15 and customer input/output interface 16, together with network signalling apparatus 17.

In dependence upon the kind of communication possible between the local switch 1 and the customer premises 12, by way of the local loop 3, additional circuitry such as a no ring call detector 18 may be incorporated in the equipment.

Primarily the customer may use the I/O interface 16 to provide amendments to the data held in data store 15 so that the network may interrogate the customer premises equipment. The processor 14 may, in respect of each call, run a number of programs to determine the destination for the next call and will provide such information to the network. Since the apparatus "B" is fully under the control of the customer, short term changes can be effected very rapidly to reflect availability, for example, of customers' own operators or staff. The various components present in "B" of FIG. 3 may of course be incorporated in a telephone in the simplest form or may be a part of a specific customer routing apparatus.

It will be appreciated that for simple call divert functions, incorporating the divert instruction in a microprocessor of an otherwise normal telephony handset together with appropriate alert detection functions could provide single customer lines with a virtual "follow me" capability.

Turning now to FIG. 4, consider the circumstances in which the customer premises 12 is connected to the local switch 1 via a so called ISDN link of the kind having at least one data channel in addition to a voice channel. Consider the PSTN of FIGS. 1 and 2 in addition to FIG. 4, if a destination local switch 1 connected to the customer premises 12 is specified as the primary destination for a network telephone number, then when the originating switch receives a call for the number it causes a C7 initial final address message (C7 IFAM) message to sent by way of the signalling path to the destination local exchange. This is the first signal shown in FIG. 4*a* in the case of a simple query. The local switch responds to the C7 IFAM message by transmitting an ISDN set up message by way of the data channel to the NTE 4 which transfers the data to the customer's processing equipment "B" as a query. In the case of FIG. 4*a* it is assumed that the output of the customer data processing apparatus "B" is a simple divert message which is returned to the NTE which returns an ISDN divert message to the DLE 1. The switch 1 now sends a C7 call drop back message to the originating local switch by way of the signalling network including the network destination to which the call is to be diverted. The originating local switch will now cause the call to be connected between the originating customer and the specified divert destination which may or may not be co-located with the customer premises 12.

The initial C7 IFAM message and the equivalent ISDN set up message simply provide an indication that there is a call for a specified destination and will include for example calling line identification in respect of the originating customer telephone line and the actual number dialled. The ISDN divert and C7 call drop back messages carry a network destination address.

In a more complex arrangement, the response to the C7 IFAM and ISDN set up messages from the customer data apparatus "B" may be to request additional information from the originating customer. This prompt and collect message to the NTE 4 results in a ISDN response data message to the local switch 1 which will forward to the originating local switch 1 a C7 network user protocol message (C7 NUP) call of drop back including a request for the originating customer to be connected to an intelligent peripheral 11 capable of providing prompt and collect function.

A prompt and collect function causes a voice message to be transmitted to the originating customer requesting additional input and giving options, for example, the intelligent peripheral 11 collecting customer digits in response thereto. The operation prompt and collect intelligent peripherals 11 is not the subject of the present application and is not discussed in detail herein. However, it will be appreciated that such intelligent peripherals have various responses to failure of customers to provide information and will react to various data messages from the control system so that at the appropriate time the originating local exchange receives additional information to transfer to the destination customer premises equipment.

Once the customer has provided the necessary additional information the signalling network reconnects the call to the customer premises 12 by causing a C7 supplementary information message (C7 SIM) to be transmitted by way of the signalling network to the DLE 1. An ISDN information message is sent in the data channel to the customer premises and a further query is directed to the customer's data processing equipment "B" which responds with a divert message which again results in an ISDN divert message to the DLE 1 and C7 call drop back message carrying the divert information to the originating local switch. The call will now be connected across the network in accordance with the destination customer's requirements.

Figure 5:
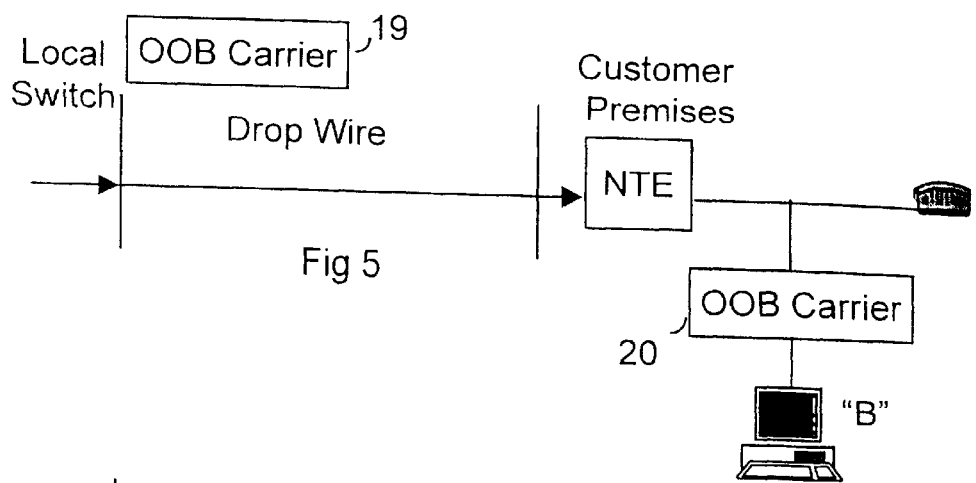
FIG. 5 shows an alternative arrangement of apparatus in the local exchange and customer premises.
Figure 5A:
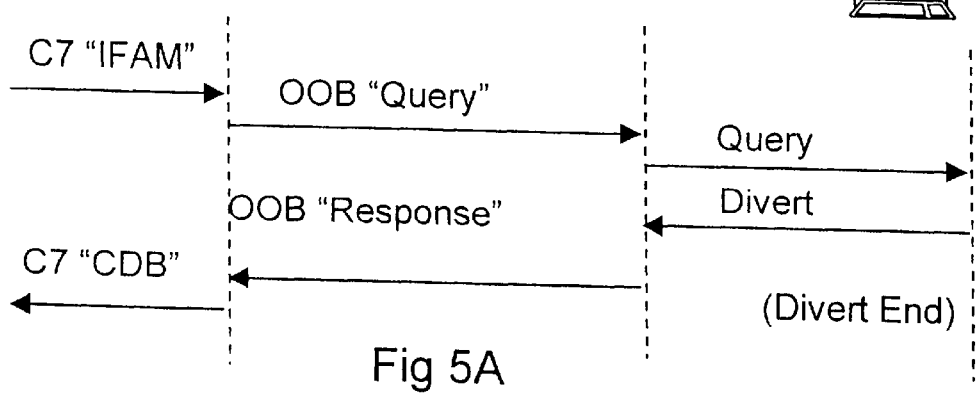
FIGS. 5a and 5b show signalling charts in respect of FIG. 5.
Figure 5B:
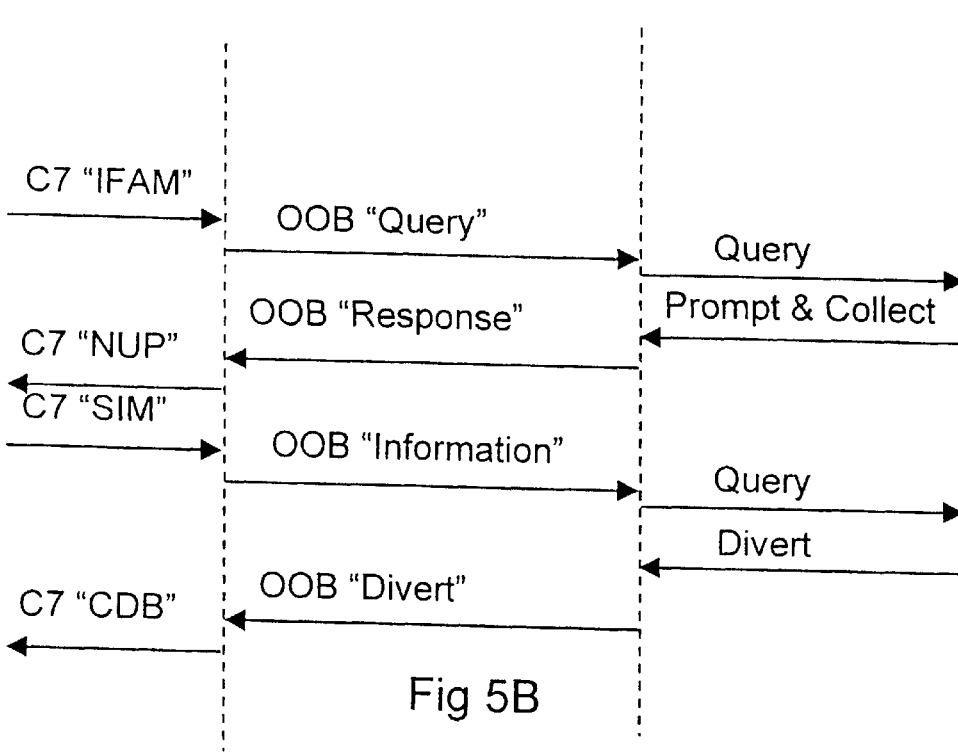

In an alternative to the system shown in FIG. 4, the system of FIG. 5 for customers having standard connections without independent data channels may be provided. In this case the DLE 1 includes for the specific customer premises equipment an out of band carrier circuit 19 which effectively provides a second telephony line to the customer premises by modulating signals at the exchange on a carrier frequency above the normal 300 Hz to 3 KHz bandwidth of the telephony line. At the customer premises 12 a corresponding out of band carrier circuit 20 is provided to enable forward and reverse signalling in the same manner. Thus, as described for FIG. 4a and FIG. 4b similar reactions to signalling across the network from the originating DLE 1 to the destination DLE will occur. In this case, however, the signalling is represented as out of band query and response information and divert signals which have the same function as the ISDN data signals previous referenced.

Figure 6:
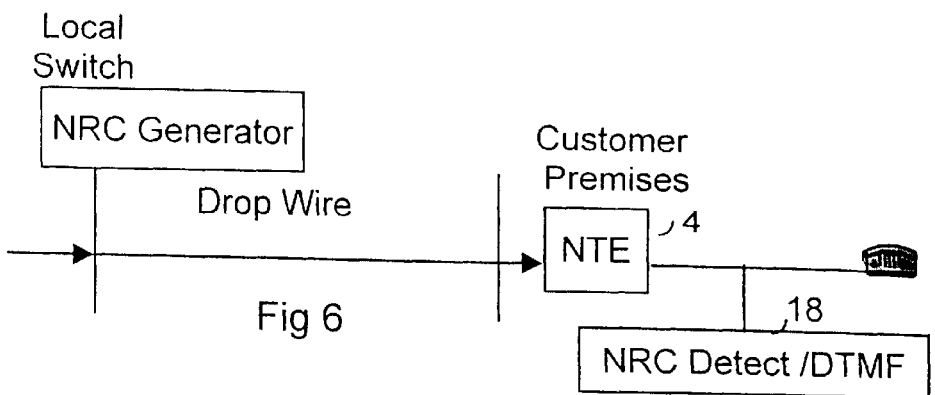
FIG. 6 shows another arrangement of signalling equipments between the local exchange and customer premises.

Turning now to FIG. 6, in the specific case where a separate data channel cannot be provided to the customer economically, then it is possible to provide the system using the no-ring call method in which tone alerts and line reversals are used to trigger detection equipment 18 without affecting normal usage of the line for telephony purposes.

Figure 6A:
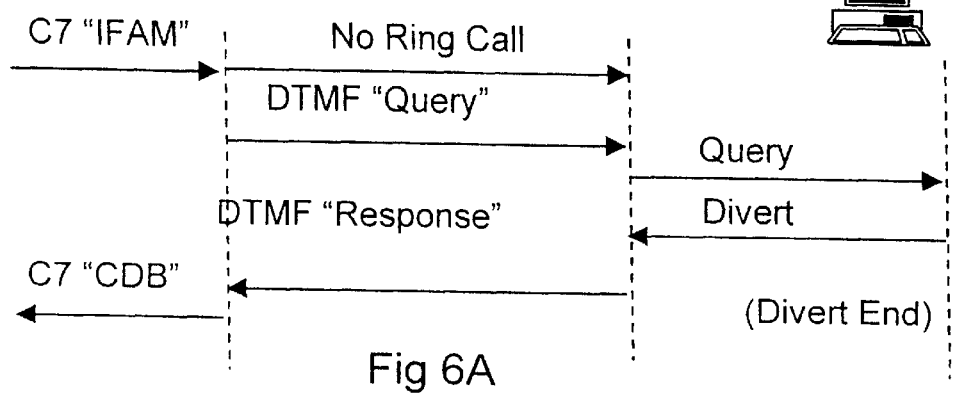
FIGS. 6a and 6b show signal interactions between the network and the equipment as shown in FIG. 6.

Referring to FIG. 6a, on a receipt of a C7 IFAM message the DLE 1 (assuming that the telephone 5 is not otherwise in use) causes a line reversal and tone signalling to be sent to the customer premise 12 by way of the NTE 4. The no-ring call detector circuit 18 is arranged to respond to a line reversal and appropriate frequency signalling to answer the call and to accept dual tone multi-frequency (DTMF) signals. In the simplest case, shown in FIG. 6a, once the no-ring call has been established and an answer detected at the destination DLE 1, a DTMF query message is forwarded resulting in a divert message coming back from the customer data processing equipment "B". This is converted to a DTMF response by the equipment 18 which then results in a C7 call drop back message giving the divert information as before.

Figure 6B:
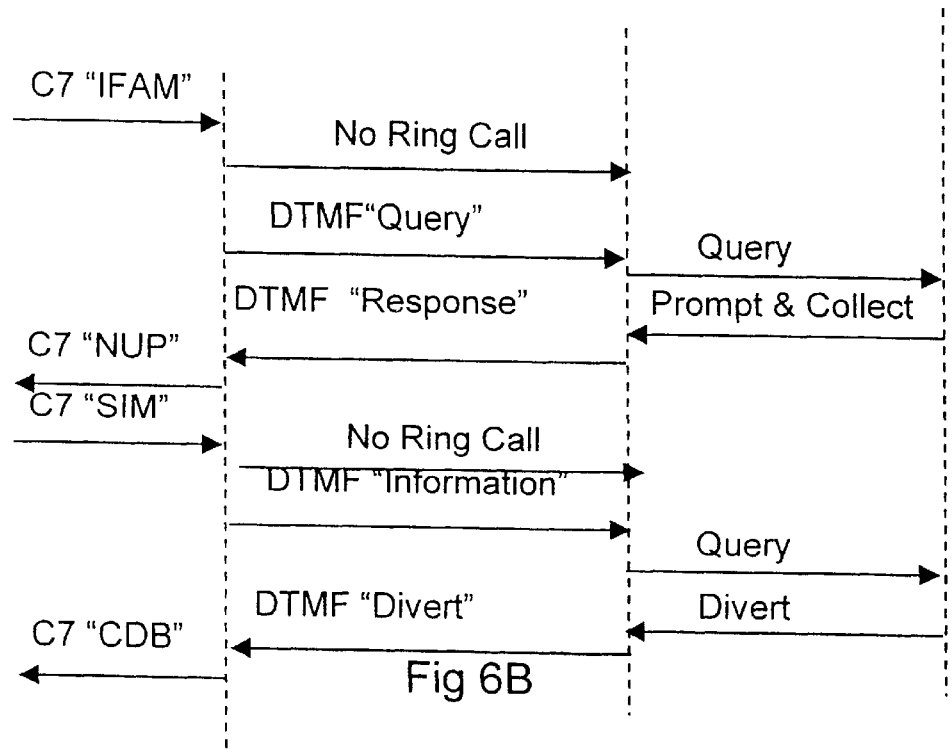

In the more complex arrangement of FIG. 6b it may be necessary for two no-ring call messages to be used. This may result in the originating customer receiving number unobtainable, for example, following prompt and collect activity if between the first no-ring call and the second no-ring call other apparatus at the customer premises 12 seizes the line.

An alternative mode of operation may be used in which after establishing the first mentioned no-ring call, the local switch holds the local loop pending receipt of the additional customer information (C7 SIM) message after which the query & divert messages previously described may be transmitted. Line holding in this manner may be subject to a local exchange time-out. Receipt of a Call Clear message from the originating local switch will also cause the line to be released.

It is noted that in this mode of operation a second call arriving for the destination customer may be handled by sending a second query message (commencing a new series) pending receipt of the information to enable the first query to be completed.

Turning now to FIG. 7, if the originating DLE 1 is not capable of generating signalling messages across the network, that is it is not responsive to, for example, C7 call drop back message, then the diversion may occur at the tandem or DMSU 2. Thus, when the local exchange receives a directory number it will set up a C7 IFAM to the DMSU 2 which in turn transmits a C7 IFAM to the local exchange and query and response will be carried out in the same manner as for FIGS. 4 to 6. However, when the C7 call drop back message is returned the call is diverted at the DMSU 2 rather than the digital local switch.

It will be appreciated that the tandem unit may be used to provide prompt and collect facilities in the more complex arrangement previously described.

Figure 8:
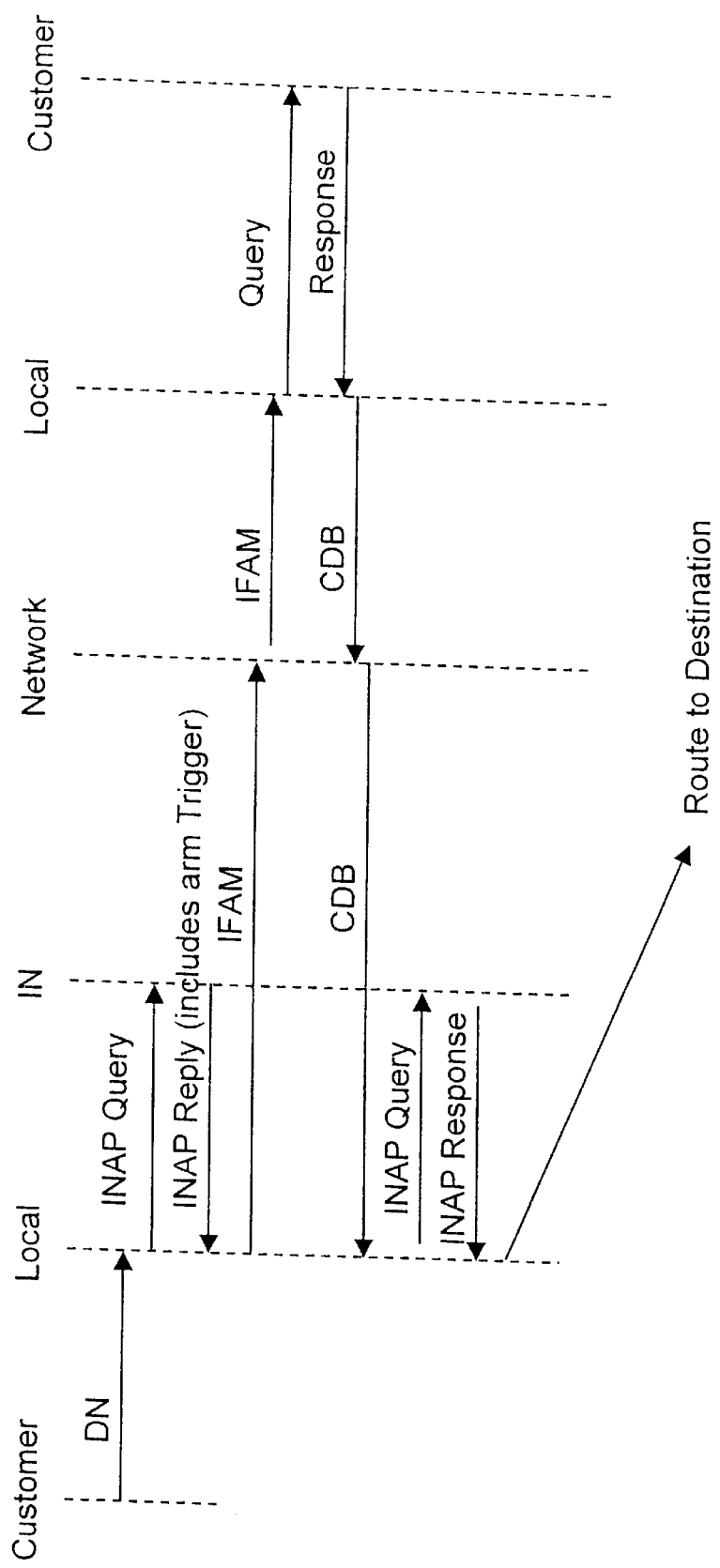
FIG. 8 shows signalling interaction in the intelligent network of FIG. 2 in a first signalling protocol arrangement.

Turning now to FIG. 8 and specifically in reference to the intelligent network of FIG. 2, when an originating customer provides a destination number in respect of the destination customer at 12 the first SSP 1 forwards an intelligent network application protocol (INAP) query message to the SCP 9 of the intelligent network. The SCP 9 forwards an INAP reply to the digital local switch noting the destination of customer premises 12 to which a further query might be directed and arming a trigger to cause the local exchange to come back to the SCP 9 on receipt of further information from the customer premises. The local DLE 1 now causes a C7 IFAM message to be sent through the network to the destination SSP which generates a query and receives a response as hereinbefore described. This now results in a call drop back message being sent across the network to the local exchange including the destination to which the current call is to be diverted.

The local SSP 1 now forwards a further INAP query message to the SCP 9 and receives a response incorporating the routing to the destination to which the call is to be connected.

Figure 9:
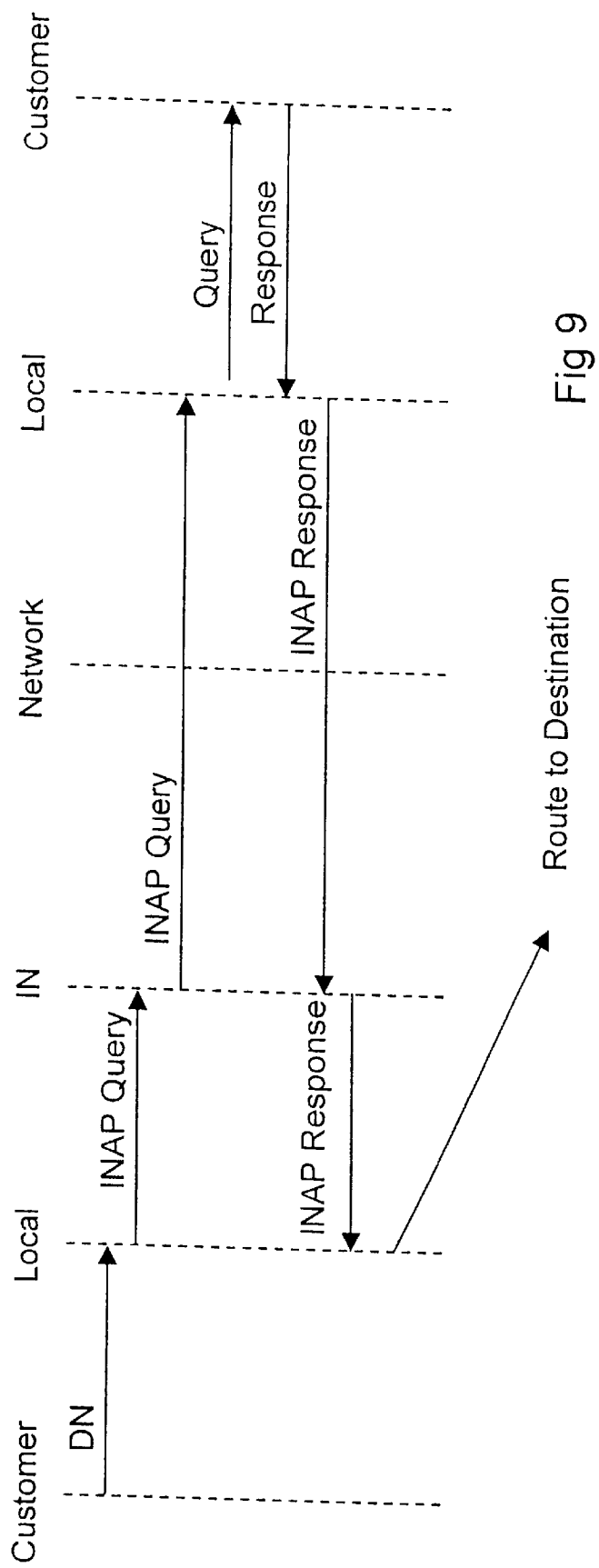
FIG. 9 shows an alternative signal interaction using a differing protocol.

FIG. 9 shows an alternative signalling protocol arrangement to that of FIG. 8. In this case, when the originating DLE 1 generates an INAP query message to the SCP 9, the SCP 9 causes a corresponding INAP query message to be sent to the destination SSP and receives an INAP response which the SCP 9 uses to determine the correct destination to which the call is to be routed. The SCP 9 incorporates the correct destination in an INAP response message to the originating local exchange which then sets up the route to the actual required destination.

Figure 10:
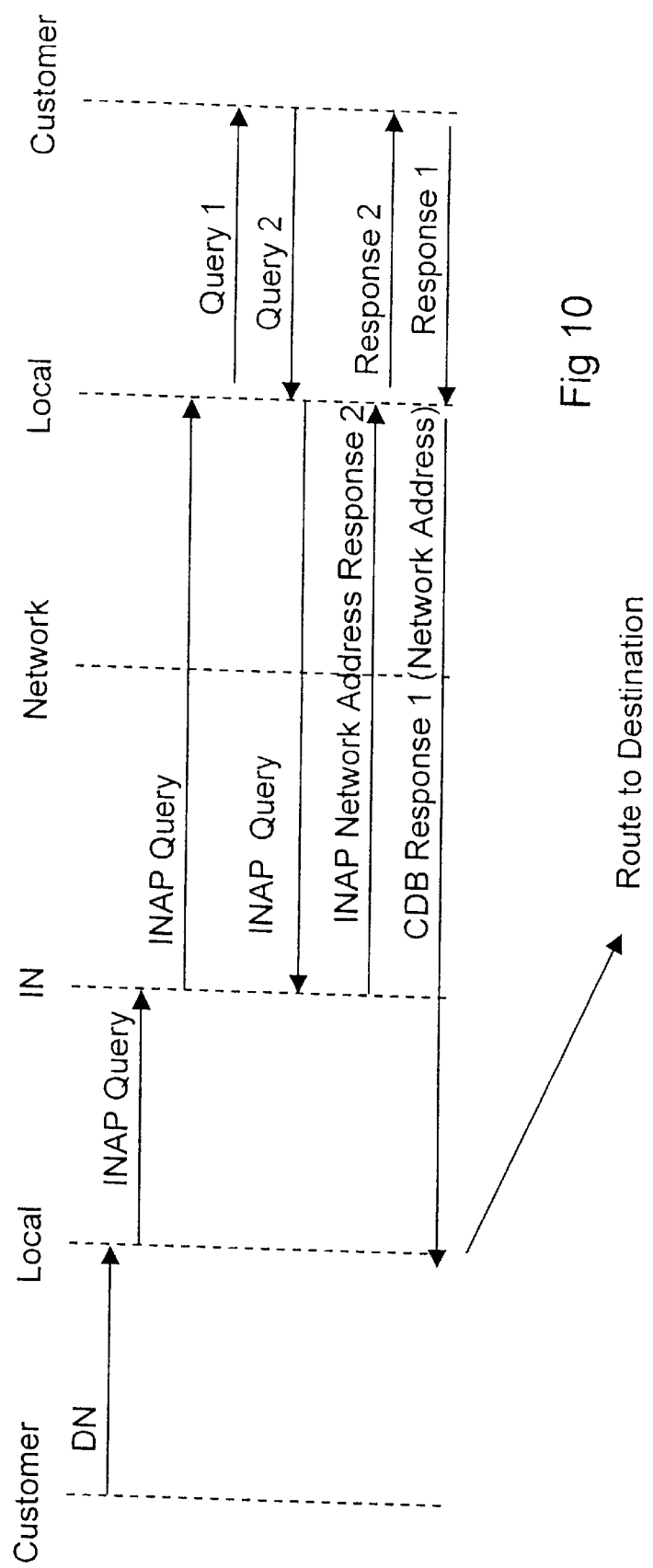
FIG. 10 shows a third signalling interaction through a third arrangement

In a further alternative mode of operation, referring now to FIG. 10, in which the customer premises equipment is arranged to determine the final destination, when the originating local SSP 1 forwards an INAP query message to the SCP 9 the query message is forwarded to the destination SSP which causes a query to be forwarded (query 1) to the customer data processing apparatus "B". The apparatus "B" returns a further query message (query 2) to the local exchange requesting actual destination information. This causes the destination SSP 1 to return an INAP query to the SCP 9 which responds with a network address corresponding to the divert destination. This response is forwarded to the customer's data processing apparatus "B" which then generates a response to the initial query, which is forwarded to the local SSP. The local SSP now returns a call drop back message to the originating local SSP which can now route to the required destination.

It will be appreciated that other redirect links to customer premises equipment by way of the network from the intelligent network SCP 9 may be used, the SCP 9 using signalling protocols corresponding to those normally used for SSP to service data point communication in intelligent network protocols.

For the avoidance of doubt, while the network signalling hereinbefore described uses C7 TUP terminology as defined by CCITT (now ITU-T) standards, other signalling protocols having compatible functionality could be used. Thus the invention may also be implemented in a PSTN using C7 ISUP as defined by ITU-T standards.

Although out of band signalling is described as being used for the communicating of the signalling between the local switch and the destination customer premises in on example above, it will be realised that he out of band channel could also be used for normal telephony purposes and the in-band channel used for signalling.

In a further development the local switch may select from a number of available (common destination) lines to the customer premises in a preferred order of communication if one or more of the links to a customers premises are in use.

What is claimed is:

1. A switching network having a plurality of switches interconnected to provide telecommunications services to customers, the network being responsive to signals from a first customer indicating a request for connection to a second customer to establish calls between the first and the second customers, the network using digital information characterising the signals received to effect connection through the network to a network termination point to customer telecommunications equipment, the network termination point being connected to at least a signalling path of customer premises equipment associated with the second customer, the customer premises equipment responding to signals transmitted by the network by transmitting to the network signals characterising a destination on the network over an established communication path, the network causing a voice path to be set up between the first customer and the specified destination characterised by the data being received causing the release of the signalling path to the customer premises equipment and connection of the first customer to apparatus which collects additional information from the first customer, said apparatus collects additional information from the first customer which additional information causes a network service control point to cause a second signalling connection to said customer premises equipment, said customer premises equipment retaining data characterising a final destination causing the first switch to effect connection through the network to the characterised destination.

2. A switching network as claimed in claim 1, wherein signalling characterising the second customer connection point is transferred across the network from a first of the plurality of switches closer to the first customer to a second of the plurality of switches closer to the second customer using a first network protocol and signalling characterising the data received from the second customer is transferred from the second switch to the first switch using the same protocol.

3. A switching network as claimed in claim 2, in which signalling between the second switch and the customer premises equipment uses a data channel of an ISDN connection.

4. A switching network as claimed in claim 2, in which signalling between the second switch and the customer premises equipment uses an out of band carrier channel on a customer premises connection.

5. A switching network as claimed in claim 2, in which the second switch includes means to effect connection of a call to the customer premises equipment using normal telephony arrangements.

6. A switching network as claimed in claim 5, in which calls established for signalling purposes use a no-ring call generator whereby signalling other than a ringing current is used to alert the customer premises equipment to an incoming call.

7. A switching network as claimed in claim 1, in which a first of the plurality of switches on receipt of signalling from the first customer requests connection information from a network service control point, the network service control point causing signalling to be forwarded to the customer premises equipment of the second customer the premises equipment returning data characterising a destination to the service control point and the service control point causing the first switch to effect connection through the network to the characterised destination.

8. A switching network as claimed in claim 7, further characterised in that on receipt of a query from the service control point the customer premises equipment returns a second query to the service control point characterising the required destination the service control point returning a network address to the customer premises equipment and the customer premises equipment returning the required network address to the first switch, the first switch effecting connection between the first customer and the destination characterised by the data received.

* * * * *